United States Patent [19]
Spencer

[11] Patent Number: 5,818,690
[45] Date of Patent: Oct. 6, 1998

[54] LAP TOP COMPUTER SYSTEM WITH FRONT ELEVATING FEET

[75] Inventor: Julian A. Q. Spencer, Vermillion, S. Dak.

[73] Assignee: Gateway 2000, Inc., North Sioux City, S. Dak.

[21] Appl. No.: 841,755

[22] Filed: Apr. 30, 1997

[51] Int. Cl.$^6$ ...................................................... G06F 1/16
[52] U.S. Cl. ........................ 361/680; 248/918; 400/715
[58] Field of Search ..................................... 400/681, 715; 248/118, 118.1, 118.3, 118.5, 688, 918; 364/708.1; 361/380; 341/22

[56] References Cited

U.S. PATENT DOCUMENTS

| | | | |
|---|---|---|---|
| D. 303,374 | 9/1989 | Larson et al. | D14/100 |
| D. 328,734 | 8/1992 | Riley et al. | D14/100 |
| 4,856,748 | 8/1989 | Obermayer | 248/688 |
| 5,111,361 | 5/1992 | Kobayashi | 361/680 X |
| 5,297,003 | 3/1994 | Nomura et al. | 361/680 |
| 5,347,424 | 9/1994 | Akahane | 361/680 |
| 5,405,204 | 4/1995 | Ambrose | 400/715 X |
| 5,469,327 | 11/1995 | Cheng | 361/680 |

OTHER PUBLICATIONS

"Microsoft® Natural™ Keyboard with IntelliType Software", *Version 1.1*, Microsoft Corporation product brochure, (See page 2) Printed in the USA (1995).

*Primary Examiner*—Michael W. Phillips
*Attorney, Agent, or Firm*—Schwegman, Lundberg Woessner & Kluth, P.A.

[57] ABSTRACT

A computer system is provided having elevating members which are coupled to a front portion of a lap top computer. The elevating members may be placed and retained in several different positions, creating varying heights of elevation for the computer. The elevating members can be retained, among other methods, by frictional engagement or mechanical stops. Additionally, the members adjustably elevate the computer system, or may alternatively be stowed underneath the computer system. When in storage or in an open position, the elevating members have a slip resistant surface for maintaining the computer in a desired location. The elevating members provide a comfortable adjustment for the portable computer, without adding significant weight to the computer. The elevating members could be used in conjunction with other types of electronic components.

10 Claims, 4 Drawing Sheets

LAP TOP COMPUTER SYSTEM WITH FRONT ELEVATING FEET

FIELD OF THE INVENTION

The present invention relates generally to portable computers. More particularly, it pertains to a lap top computer having a device for elevating a front portion of the computer above a base surface.

BACKGROUND OF THE INVENTION

Greater attention has recently been given to designing work space and equipment for efficient and comfortable use. Situations where the shoulders are flexed or shrugged for long periods of time can lead to discomfort in the shoulder muscles. Analogously, work which requires frequent flexing of the wrist, or prolonged use of the wrist in a flexed position also can lead to discomfort in the wrist area.

The use of lap top computers has increased dramatically as they have become more portable, and simultaneously more powerful. Furthermore, computer users are using computers for longer periods of time. As users operate the computer in a wide variety of places for longer periods of time, the computer must acclimate to many different surroundings and to many different positions for the user.

Lap top computers typically provide a flat keyboard, which remains flat when the computer is placed on a work surface. Given the wide variety of locations at which a lap top computer may be used and the variety of sizes of people using the computer, a flat keyboard for placement on a base surface may not always provide a comfortable typing position for the computer user. Lap top computers have been provided with adjustable screens, where the user can adjust the viewing angle of the screen. However, the keyboard for the lap top computer remains flat relative to a base surface.

Standard desk top keyboards are typically provided at an angle to the desk top surface, where the rear portion of the keyboard is elevated. Devices for elevating stand alone keyboards are known in the art. One such device is described in U.S. Pat. No. 4,568,056 granted to Lewinski on Feb. 4, 1986, which discloses a rear tilt mechanism for a stand-alone keyboard. The '056 patent teaches a tilt mechanism which has two springs located within a computer keyboard having narrow feet for elevating the keyboard. This structure requires a large amount of internal space within the keyboard, which is quite valuable in a lap top computer. In addition, the rear portion of the keyboard is tilted up, thereby requiring a computer user to further flex the wrist joint during computer use on certain surfaces. After long periods of computer use with the wrist in a flexed position, the user can experience pain and discomfort.

Another approach to raising a stand-alone keyboard is Microsoft's Wrist Leveler, Microsoft Part No. 59758. The Wrist Leveler provides a bar which flips down under a front portion of a stand-alone keyboard. However, the Wrist Leveler is limited to desk-top use alone.

Support devices for elevating a rear portion of lap top computers are also known in the art. A detachable support device is described in U.S. Pat. No. 5,337,985 issued on Aug. 16, 1994 to Hale, which teaches a rear support device for a lap top computer. The '985 patent teaches a support device comprising a set of two panels formed at a right angle. To elevate the lap top computer, the V-shaped devices are affixed to a rear portion of a bottom surface of the computer by a fastener, such as hook-and-loop material, which is applied to both the computer surface and the support devices. The devices are detachable from the lap top computer, and are removed when not in use. The panels are not adjustable; the user has the option of using them at the rear portion of the computer at a preselected height, or not using the panels at all. Since the panels are detachable, they may become lost when they are unattached to the computer. When using the device of the '985 patent, a computer user may experience wrist pain after prolonged use from working with flexed wrists.

Accordingly, there is a need for a better way to elevate a lap top computer system without requiring large amounts of internal system space. In addition, there is a need to provide adjustability of the computer system to provide increased comfort to computer users.

SUMMARY OF THE INVENTION

It is an object of the invention to provide a device for adjusting a lap top computer to a comfortable position during operation of the computer. A portable computer system is provided with elevational features for raising the front portion of a portable computer. The invention includes a portable computer comprised of a computer body encompassing a computer system, and an elevating member hingedly connected to the computer body. The elevating member is pivoted towards a base surface to provide an adjustable elevational device for the computer system. Alternatively, the door member is pivoted beneath the portable computer system, and stowed within a cut-out. In one embodiment, the cut-out is sized larger than the elevating member such that a computer user can insert an instrument and open the elevating member.

Each elevating member has pins disposed on side surfaces which are received by apertures within the cut-out. The pins of the elevating member are held within the apertures. The apertures and the pins are provided with corresponding flats to support the portable computer in an elevated position. The elevating member can be placed in a position where it forms approximately a 90-degree angle with a base surface to provide a maximum elevation for the portable computer system. Alternatively, the elevating member provides an adjustable elevational device when it is engaged in positions where the elevating member forms an angle substantially greater or less than 90 degrees with the base surface. The elevating member is also provided with a slip-resistant surface on a lower resting surface.

The present invention allows a user to adjustably elevate a lap top computer. Elevating the front portion of the lap top computer permits a user to type in a more relaxed position wherever the user desires to use the portable computer. A computer user can enjoy a comfortable typing posture wherever the portable computer is used. The portable computer will advantageously be more adjustable, offering more comfortable typing positions for a computer user.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
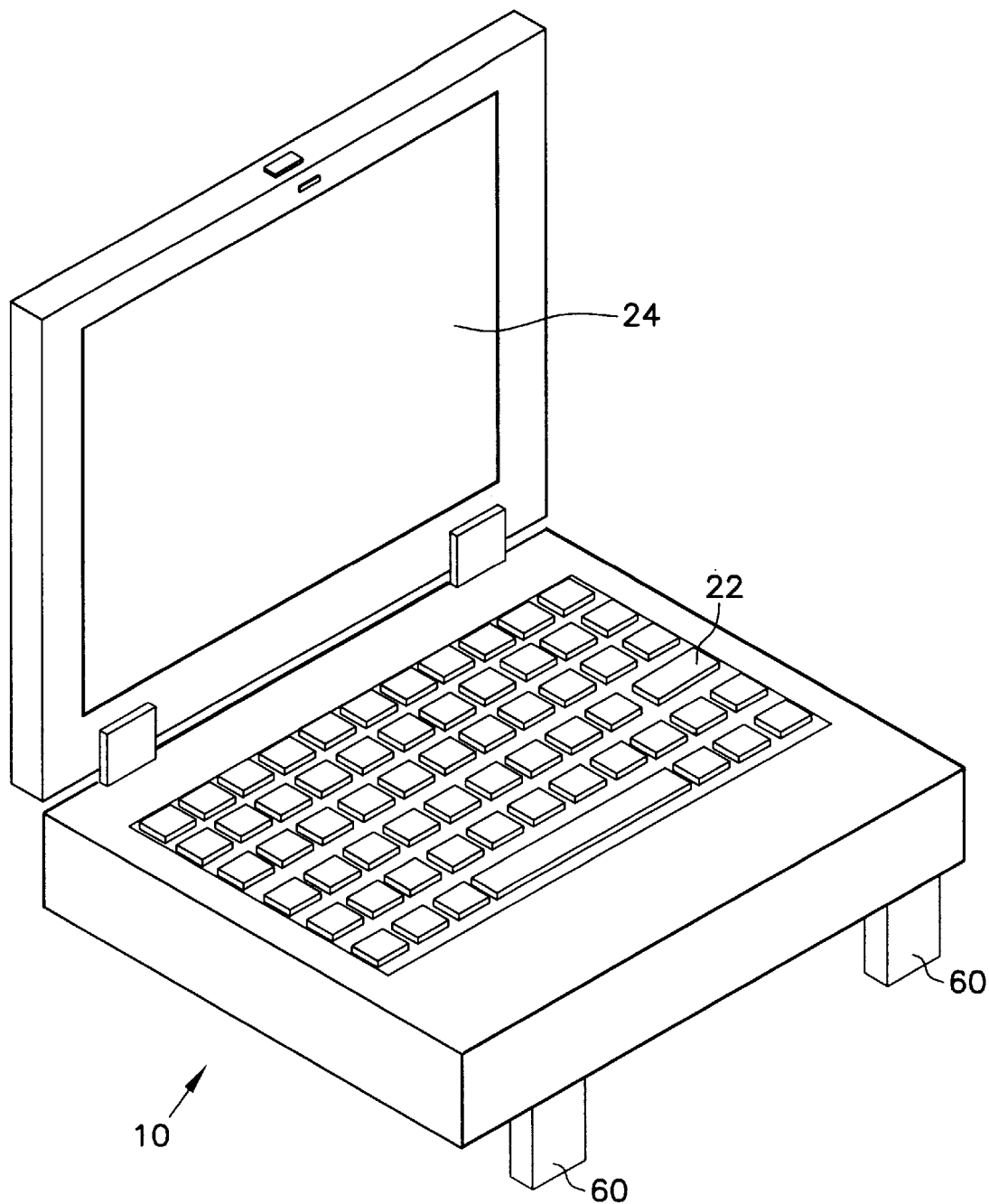
FIG. 1 is a perspective view illustrating a portable computer constructed in accordance with one embodiment of the present invention.

Referring to the drawings, FIG. 1 illustrates a portable computer 10 constructed in accordance with one embodiment of the present invention. The portable computer 10 is shown with elevating members 60. The elevating members 60 are shown in an open position to elevate the computer 10 when set on a base surface. Various levels of elevation are achieved by positioning the elevating members 60 at a variety of angles relative to the base surface.

The portable computer 10 comprises a computer body 20 which houses the computer system (not shown). Coupled to the rear portion of the computer body 20 is a display 24. The computer body 20 is defined in part by a first top surface 18 and a lower bottom surface. The computer body 20 has a keyboard 22 on the first top surface 18 to provide an input mechanism for the computer system.

Figure 2:
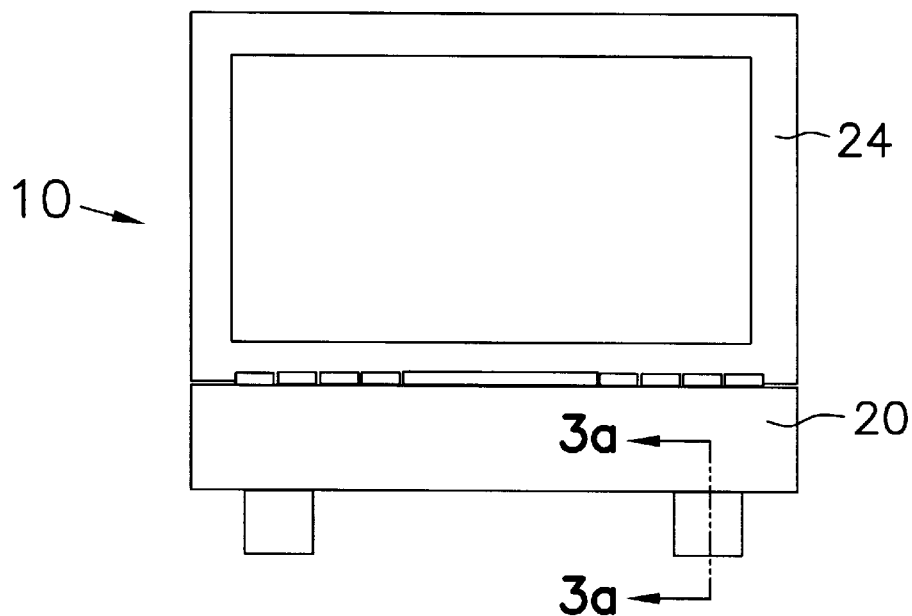
FIG. 2 is a front elevational view illustrating a portable computer constructed in accordance with another embodiment of the present invention.
Figure 3A:
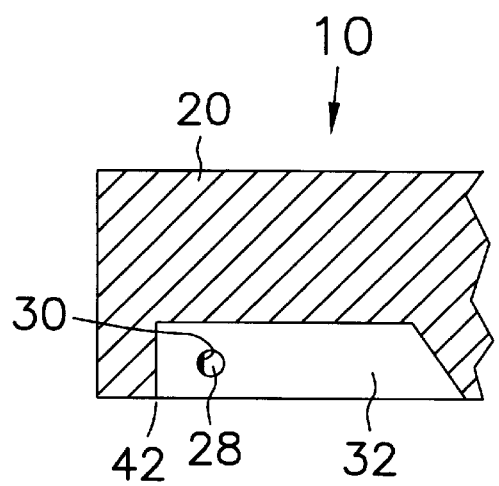
FIG. 3a is an enlarged sectional view illustrating a portable computer taken along line 3—3 of FIG. 2 before an elevating member is installed.
Figure 3B:
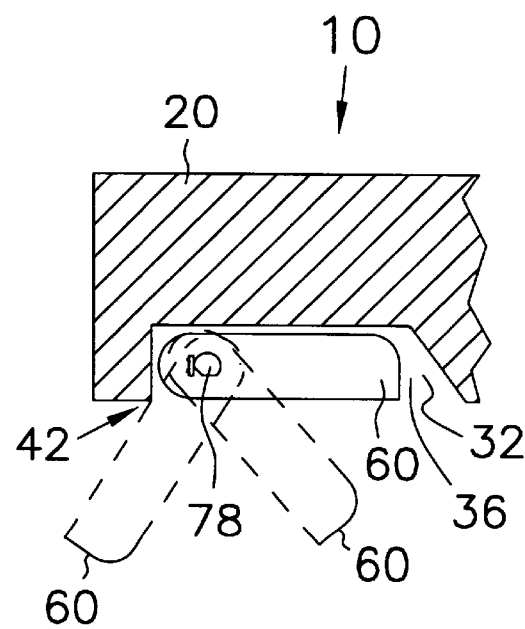
FIG. 3b is an enlarged sectional view illustrating a portable computer taken along line 3—3 of FIG. 2 after the elevating member is installed.

FIG. 2 shows a front plan view of a portable computer, from which the section views shown in FIGS. 3a and 3b are taken. FIG. 3a shows a partial section of the modified portable computer 10 taken along line 3—3 before the installation of the elevating member 60. A lower surface of the computer body 20 has a cut out 32 therein. One embodiment discloses two cut outs 32, spaced such that each cut out 32 is near a side surface of the portable computer 10. The cut outs 32 are proximate to a front portion of the portable computer 10. As shown in FIG. 3b, each cut out 32 is sized to receive an elevating member 60 therein. In another embodiment, the cut out 32 is sized larger than the elevating member 60, leaving space 36 for insertion of an instrument such as a finger, screw driver and the like to apply force to and open the elevating member 60. The cut outs 32 are further provided with a mechanical stop 42. The mechanical stop 42 aids in supporting the weight of the portable computer when elevating members 60 are placed in an open position.

Figure 4A:
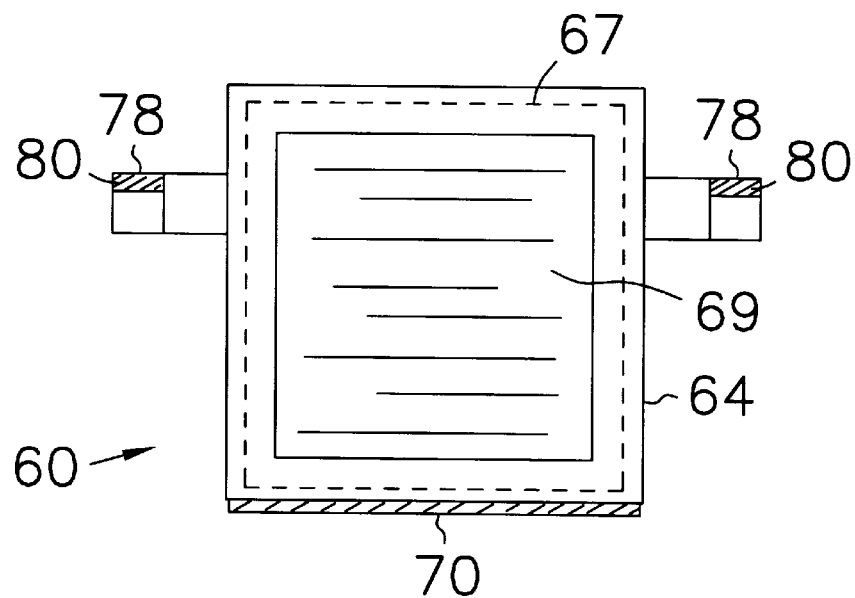
FIG. 4a is an elevational view illustrating an inner surface of the elevating member.
Figure 4B:
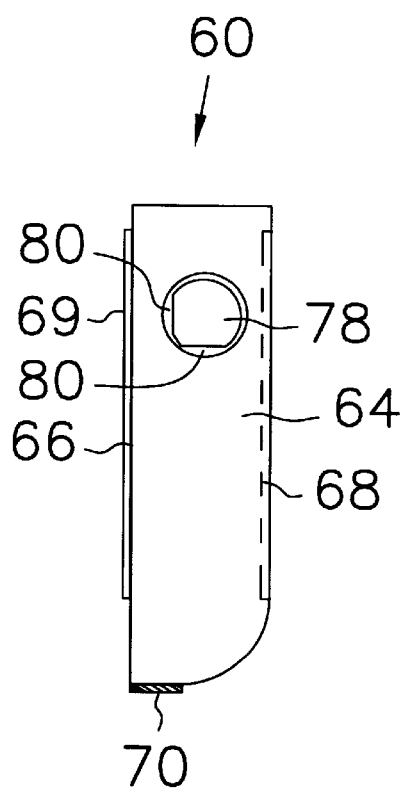
FIG. 4b is a side elevational view illustrating a side surface of the elevating member.

FIGS. 4a and 4b show the elevating member 60 in greater detail. The elevating member 60 is substantially rectangular or square in shape, although other shapes are contemplated by the scope of the invention. Defining the elevating member 60 are the side surfaces 64, an outer surface 66, an inner surface 68, and a lower resting surface 70.

The two side surfaces 64 of each elevating member each have a pin 78 projecting therefrom. The pin 78, having a substantially circular profile, extends to a length where the pin can be sufficiently engaged to support the weight of the computer body without deforming the elevating member 60.

The pin 78 may also have other profiles. For instance, in one embodiment the pin 78 has a pin flat 80 for mating with aperture flats 30 (FIG. 3a). Alternatively, the pin 78 has a plurality of flats for creating multiple open positions for the elevating member, thereby creating adjustability in elevation of the computer. The pin flats 80 provide a resting surface for supporting the computer in an elevated position, as shown in FIG. 3b.

In one embodiment, the inner surface 68 of the elevating member 60 may have a grooved surface. The grooved surface of the inner surface 68 aids in placing the elevating member 60 in an open position as it provides a surface to place a finger against to draw the elevating member 60 open. In yet another embodiment, the inner surface 68 is formed with a cut out 67 such that the elevating member 60 is substantially hollow. The cut out 67 aids in reducing the weight of the elevating member, and the portable computer 10, which is a serious design challenge facing computer manufacturers today. The cut out 67 also aids the computer user in opening the elevating members 60 by allowing a finger to curl around the member 60 as it placed in an open position.

The outer surface 66 of the elevating member 60 is provided with a slip resistant surface 69. A rubber strip of material or a rubber pad and the like are suitable materials for providing the slip resistant surface 69. The slip resistant surface 69 aids in retaining the computer 10 in place when the elevating member 60 is placed in a closed position. The slip resistant surface 69 will also assist in preventing a computer 10 from being inadvertently pushed off of a base surface when the elevating members 60 are in a closed position.

When the elevating member 60 has been placed in an open position, the lower resting surface 70 of the elevating member 60 supports the portable computer 10 in an elevated position with respect to a base surface. The lower resting surface 70 of another embodiment has a slip resistant surface. Although other methods of providing a slip resistant surface are contemplated, the slip resistant surface may be formed by adhesively affixing a rubber pad to the lower surface 70, or by fabricating a textured surface integral to the lower resting surface 70.

The elevating member 60 is coupled with the computer body 20 in many different ways. In one embodiment as shown in FIG. 3a, each cut out of the computer body has two apertures 28 therein for receiving each pin 78 of each corresponding elevating member 60. The apertures 28 each have a flat 30 for engaging and retaining the pin 78 in a predetermined angle. The flat 30 is a tension member providing frictional engagement of the pins 78. Each pin 78 of each rotating member 60 is received by a corresponding aperture 28 of the computer body cut out 32. Every pin 78 is sized to be received within the aperture 28 of the cut out 32. The elevating member 60 then rotates about the axis of the pin 78. Alternatively, the apertures 28 could be formed integral with the elevating member 60, and the pins 78 formed integral with the cut out 32.

Although the axis of the pins 78 and apertures 28 are shown in a parallel relationship with respect to the front surface of the keyboard, other angles could be used. For instance, the axis of the pins and apertures could be perpendicular to the front surface of the portable computer.

The elevating member 60 can be retained in an open position using a variety of approaches. For instance the elevating member 60 can be retained in an open position using a combination of projections for mating with detents, button locks, or mechanical stops. Alternatively, a frictionally engaged telescoping elevating member could be used for maintaining a front portion of the portable computer in an elevated position. A frictionally engaged screw mechanism attached to the elevating member could be used for the elevating the front portion of a portable computer. The rotational axis of the screw mechanism would be substantially perpendicular to the lower bottom surface, and the computer would be elevated as a user rotates the screw mechanism in to an open position.

Another approach for retaining the elevating member 60 in an open position involves providing the elevating member with a spring bias (not shown) with a latch to prevent the elevating member 60 from opening. To elevate the computer for this approach, the user releases the latch and the elevating member 60 springs open and rests against a mechanical stop 42 to support the computer 10 in an elevated position.

Alternatively, the elevating member 60 is maintained in a closed position using either a latch or friction fit, or other equal alternative. Once the latch is removed, or the elevating member is disengaged from its friction fit, the elevating member 60 drops away from the portable computer 10 and rests against the mechanical stop 42 to retain the computer 10 in an elevated position. This embodiment for elevating the front portion is similar to the rear elevating feet of the Solo™ portable computer, made by Gateway 2000, Inc. of North Sioux City, S. Dak.

Figure 5:
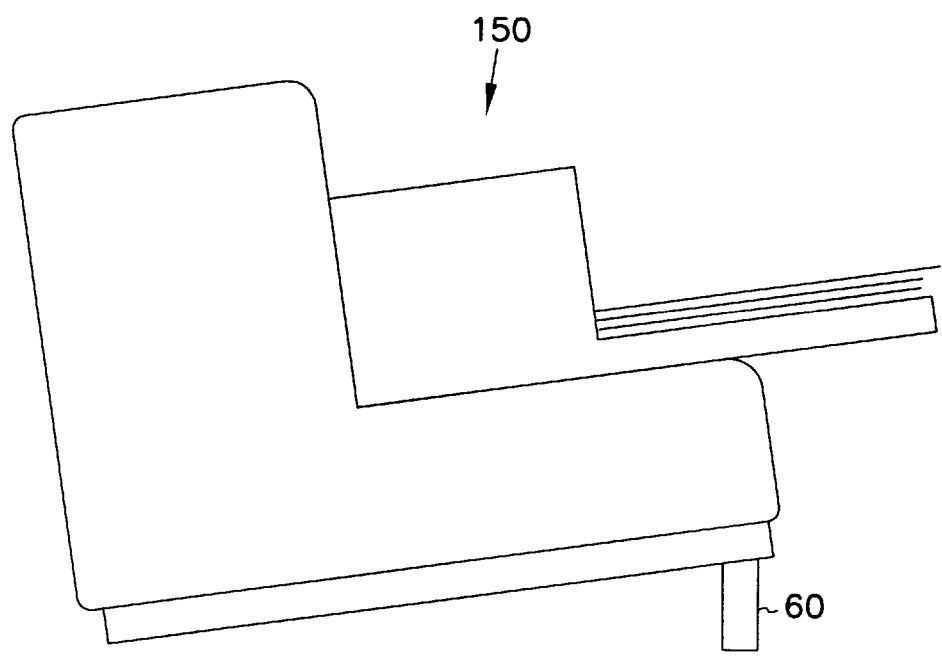
FIG. 5 is a side elevational view illustrating a printer constructed in accordance with one embodiment of the present invention.

In another embodiment, the elevating members 60 could be coupled with other types of electronic devices. For instance, as shown in FIG. 5, the elevating members 60 could be used to elevate a front portion of a printer 150. Further, the present invention could also be used for elevating the front portion of other electronic components such as telephones, fax machines, scanners, desk top computers, computer monitors, speakers, calculators, and the like, and are considered within the scope of one embodiment of the invention. These types of devices are well known in the art and, therefore, will not be described in further detail herein.

In operation, the computer user places the portable computer 10 in an elevated position by rotating the elevating member 60 away from the lower surface of the computer body. The elevating member 60 is in an open position, and provides elevation to the front portion of the portable computer 10. The frictional engagement of the pin 78 allows the user to adjustably elevate the front portion of the portable computer. As illustrated in FIG. 3b, a user may adjust the level of elevation by partially opening the elevating member 60. For maximum elevation, the user opens the elevating member 60 to a position where it forms a 90 degree angle with a base surface.

Each elevating member 60 is placed in a closed position by rotating the elevating member 60 toward the lower surface of the computer body 20 until it is received by the cut out 32. In its closed position, each elevating member is substantially flush with the lower surface of the computer body 20, and the portable computer 10 rests flat on the base surface.

Advantageously, the thin wall design, described above as one of the embodiments, achieves the elevation of the portable computer, and simultaneously permits inexpensive methods of manufacture as available options. For instance, the elevating member could be injection molded from a thermoplastic or otherwise appropriate material. Alternatively, the elevating member could have other profiles, or be more simply shaped thereby accommodating other types of manufacturing processes. For instance, the elevating members could be made from a U-shaped metal wire structure. The elevating members manufactured using these methods do not add significant weight to the portable computer.

The invention provides increased adjustability to computer users through the adjustable front raising elevating member. The computer user can maximize the range of adjustability of the portable computer by adjusting the rotatably mounted computer screen, and then adjusting the elevation of the keyboard of the portable computer.

The elevating members provide a convenient and inexpensive way to elevate portable computers, without requiring additional components or significantly adding to the weight of the portable computer. Advantageously, the elevating members 60 are stable and compact and do not occupy significant amounts of the valuable internal space of the computer system.

It is to be understood that the above description is intended to be illustrative, and not restrictive. Many other embodiments will be apparent to those of skill in the art upon reviewing the above description. For instance, the present invention could be used in conjunction with existing elevating devices, or elevating devices for lifting a rear portion of a portable computer. The scope of the invention should, therefore, be determined with reference to the appended claims, along with the full scope of equivalents to which such claims are entitled.

What is claimed is:

1. A portable computer comprising:
   a computer system;
   a computer body encompassing the computer system, the computer body supporting a keyboard in a first top surface of the computer body; the computer body having a front portion and a rear portion, where said front portion is placed nearer an operator than said rear portion during operation of said computer system and
   at least one elevating member for elevating a front portion of the computer body, each elevating member coupled to a lower bottom surface of the computer body proximate to the front portion of the computer body such that when an elevating member is placed in an open position the front portion of the computer body is elevated, each elevating member further comprising means for retaining the elevating member in an open position;
   each elevating member further comprising pins,
   wherein the pins of the elevating member are frictionally engaged with corresponding apertures of the computer body, whereby the elevating member is frictionally retained in a plurality of angles relative to a base surface such that adjustability of elevation is provided.

2. The portable computer as recited in claim 1, wherein an inner surface of the elevating member has grooves thereon.

3. The portable computer as recited in claim 1, wherein a lower resting surface of the elevating member has a slip resistant surface thereon.

4. The portable computer as recited in claim 3, wherein the slip resistant surface comprises rubber material attached to the lower resting surface.

5. The portable computer as recited in claim 4, wherein the rubber material is adhesively attached to the lower resting surface.

6. The portable computer as recited in claim 1, wherein an outer surface of the elevating member has a slip resistant surface thereon.

7. A portable computer comprising:

a computer system;

a computer body encompassing the computer system, the computer body being defined by a top surface, a bottom surface, two side surfaces, the computer body supporting a keyboard in the top surface of the computer body;

the computer body having two cut outs in a lower surface of the computer body, the cut outs each proximate to the two side surfaces of the computer body;

two elevating members for elevating a front portion of the computer body, the elevating members being coupled to the lower bottom surface of the front portion of the computer body such that when an elevating member is placed in an open position the front portion of the computer body is elevated with respect to a base surface;

each elevating member defined by two side surfaces, an outer surface, an inner surface, and a lower resting surface, the two side surfaces of each elevating member each having pins extending outwardly therefrom;

each cut out of the computer body having apertures therein, said apertures positioned correspondingly to receive said pins of each elevating member therein; and the elevating members sized to be received within the cutouts, the elevating members each being disposed within the cut-outs in a closed position;

wherein the apertures are dimensioned to frictionally engage the pins.

8. A portable computer system as recited in claim 7, wherein the cut out and the elevating member have a predetermined thickness, whereby the outer surface of the elevating member is flush with the lower surface of the computer body when the elevating member is placed in a closed position.

9. A portable computer system as recited in claim 7, wherein the inner surface of each elevating member has a cut out therein, whereby the elevating member is hollow.

10. A portable computer system as recited in claim 7, wherein each elevating member has a rectangular shape.

* * * * *